United States Patent
Arpa et al.

(10) Patent No.: US 7,869,621 B1
(45) Date of Patent: Jan. 11, 2011

(54) METHOD AND APPARATUS FOR INTERPRETING IMAGES IN TEMPORAL OR SPATIAL DOMAINS

(76) Inventors: Aydin Arpa, 6622 Southpoint Dr. South Suite 310, Jacksonville, FL (US) 32216; Gianni Arcaini, 6622 Southpoint Dr. South Suite 310, Jacksonville, FL (US) 32216

( * ) Notice: Subject to any disclaimer, the term of this patent is extended or adjusted under 35 U.S.C. 154(b) by 887 days.

(21) Appl. No.: 11/759,638

(22) Filed: Jun. 7, 2007

(51) Int. Cl.
*G06K 9/00* (2006.01)

(52) U.S. Cl. .................. 382/104; 382/182; 382/284

(58) Field of Classification Search ............ 382/104
See application file for complete search history.

(56) References Cited

U.S. PATENT DOCUMENTS

| | | | |
|---|---|---|---|
| 4,589,140 A | 5/1986 | Bishop | |
| 4,847,772 A * | 7/1989 | Michalopoulos et al. | 701/117 |
| 5,073,819 A | 12/1991 | Gates | |
| 5,392,034 A * | 2/1995 | Kuwagaki | 340/933 |
| 5,583,765 A * | 12/1996 | Kleehammer | 701/1 |
| 5,734,337 A * | 3/1998 | Kupersmit | 340/937 |
| 5,809,161 A * | 9/1998 | Auty et al. | 382/104 |
| 5,938,717 A * | 8/1999 | Dunne et al. | 701/117 |
| 6,067,367 A * | 5/2000 | Nakajima et al. | 382/103 |
| 6,198,987 B1 * | 3/2001 | Park et al. | 701/1 |
| 6,404,902 B1 * | 6/2002 | Takano et al. | 382/104 |
| 6,496,598 B1 * | 12/2002 | Harman | 382/154 |
| 6,538,579 B1 * | 3/2003 | Yoshikawa et al. | 340/928 |
| 6,546,119 B2 * | 4/2003 | Ciolli et al. | 382/104 |
| 6,628,804 B1 * | 9/2003 | Edanami | 382/107 |
| 6,681,195 B1 * | 1/2004 | Poland et al. | 702/142 |
| 6,696,978 B2 * | 2/2004 | Trajkovic et al. | 340/936 |
| 6,734,896 B2 * | 5/2004 | Nobori et al. | 348/148 |
| 6,766,038 B1 * | 7/2004 | Sakuma et al. | 382/107 |
| 6,985,827 B2 * | 1/2006 | Williams et al. | 702/142 |
| 6,996,255 B2 * | 2/2006 | Sakuma et al. | 382/107 |
| 7,016,518 B2 | 3/2006 | Vernon | |
| 7,027,616 B2 * | 4/2006 | Ishii et al. | 382/104 |
| 7,439,847 B2 * | 10/2008 | Pederson | 340/5.81 |
| 2002/0034316 A1 * | 3/2002 | Ishii et al. | 382/104 |
| 2002/0047901 A1 * | 4/2002 | Nobori et al. | 348/149 |
| 2002/0094110 A1 * | 7/2002 | Okada et al. | 382/104 |
| 2002/0141618 A1 * | 10/2002 | Ciolli et al. | 382/104 |
| 2003/0021490 A1 * | 1/2003 | Okamoto et al. | 382/284 |
| 2004/0218786 A1 * | 11/2004 | Murakoshi et al. | 382/107 |
| 2005/0008194 A1 * | 1/2005 | Sakuma et al. | 382/104 |
| 2007/0122058 A1 * | 5/2007 | Kitaura et al. | 382/284 |
| 2008/0013790 A1 * | 1/2008 | Ihara et al. | 382/104 |
| 2008/0211914 A1 * | 9/2008 | Herrera et al. | 348/148 |

* cited by examiner

*Primary Examiner*—Sath V Perungavoor
(74) *Attorney, Agent, or Firm*—Lawrence J. Gibney, Jr.

(57) ABSTRACT

This is a method and apparatus to create and interpret images in a temporal or spatial domain, which will be helpful with any moving objects. The images are captured and stored in a database. The video images can be viewed in a panoramic fashion or dissected into individual frames or pictures to make the searching of particular objects or events easier.

6 Claims, 2 Drawing Sheets

METHOD AND APPARATUS FOR INTERPRETING IMAGES IN TEMPORAL OR SPATIAL DOMAINS

BACKGROUND OF THE INVENTION

A. Field of the Invention

This relates to recording video images at a remote location and placing them into an easily readable form at a remote facility. The method and apparatus will provide adequate information about the images both from a temporal as well as a spatial perspective.

B. Prior Art

This particular device records video images at remote locations and places them in easy and readable forms at different remote facilities. This system employs cameras, which can be mounted at a variety of different places. There are other systems that use video capture devices to record scenes. The cameras themselves may have infrared or low level light capability. Representative examples of this type of device in the prior art include Vernon, U.S. Pat. No. 7,016,518, and Ciolli, U.S. Pat. No. 6,546,119.

The Vernon device provides an infrared illuminator in a camera for capturing an image of an automobile vehicle license plate. This particular device allows the operator of the device to determine whether or not to allow a vehicle into a secured area. The Ciolli device is an automated traffic violation monitoring and reporting system. This device uses a camera system, which is coupled to a data processing system for compiling vehicle and scene images produced by the camera system. This is important for law enforcement agencies.

Another device to measure the speed of a vehicle includes Kupersmit, U.S. Pat. No. 5,734,337. Again, this uses a camera and specifically detects motion.

Other examples in the prior art, which include video survey, are Gates, U.S. Pat. No. 5,073,819, and Bishop, U.S. Pat. No. 4,589,140.

None of the prior art references incorporate all the features of this particular method and apparatus.

BRIEF SUMMARY OF THE INVENTION

This particular method and apparatus would be a temporal data interpretation mechanism, which would accomplish three separate objectives.

Firstly, the method would provide the ability to conduct a search of objects and events in a scene. Secondly, the method would provide the ability to query geographically a particular object and lastly the method would provide a compact, easily readable presentation. The images may be captured and stored in a remote location and then viewed by individuals in a plurality of different, geographically distant locations.

Although the railroad industry will be highlighted with this application, this method and apparatus may be used in a variety of other applications. In fact any event which involves moving objects would be suitable for this application. Some representative venues for this type of application may include highways, airports, parking garages or large shopping centers.

There are several different components to this method and apparatus. One component captures and integrates the temporal information. Another component of the method allows a particular event to be viewed apart from other events or dissected apart from the others. The third is the object and event search; this is important if the time of an event is known. Another feature of this method is the ability to read text from objects by incorporating optical character recognition software; this feature is valuable if the numbering on a specific item such as a railroad car or container is known.

All captured images in the method and apparatus may be stored for security, law enforcement purposes or forensic purposes. A search of the stored information on the database can direct the operator to a certain time and space for improved security operations.

DETAILED DESCRIPTION OF THE EMBODIMENTS

Figure 1:
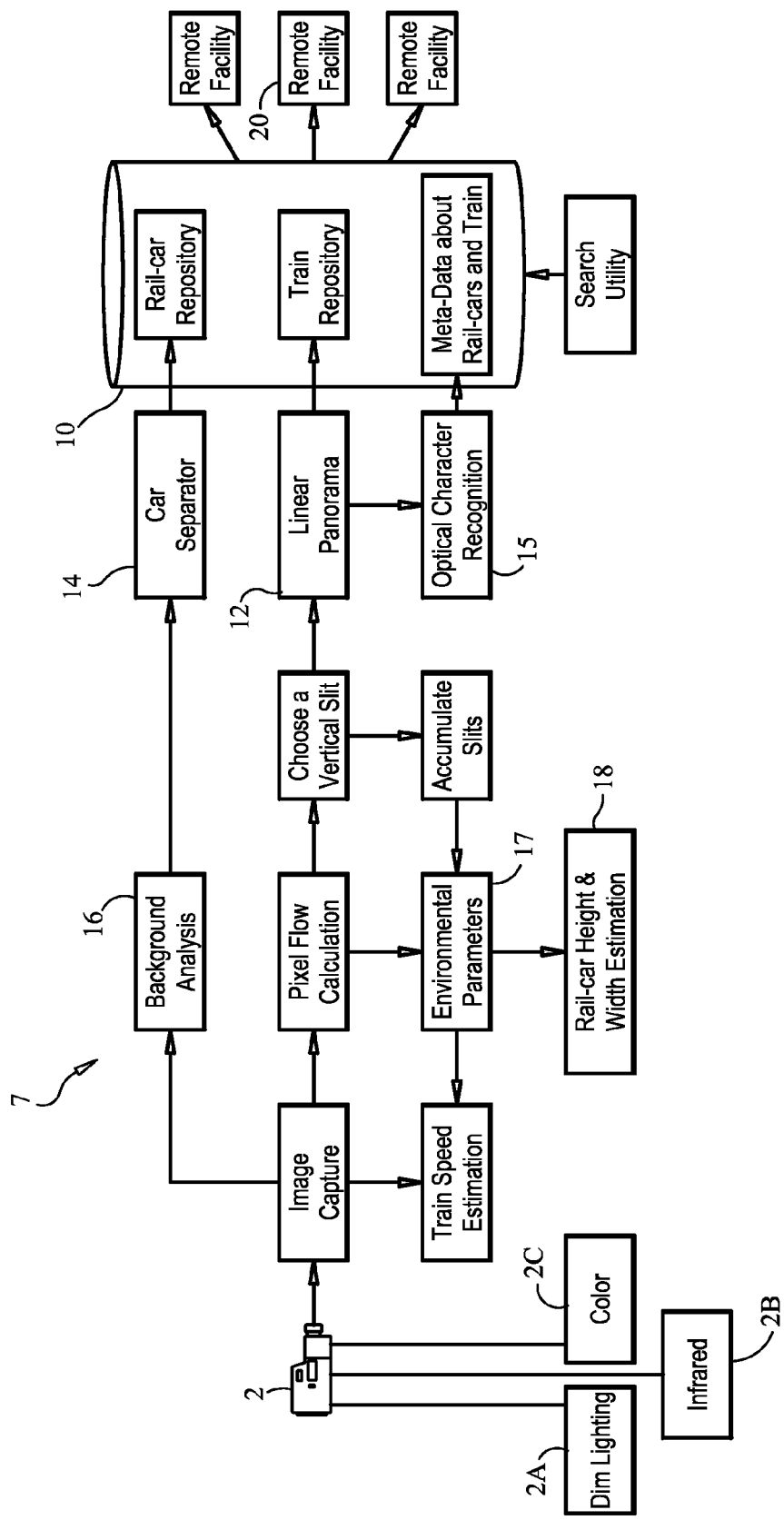
FIG. 1 is a flow chart of the various system components.
Figure 2:
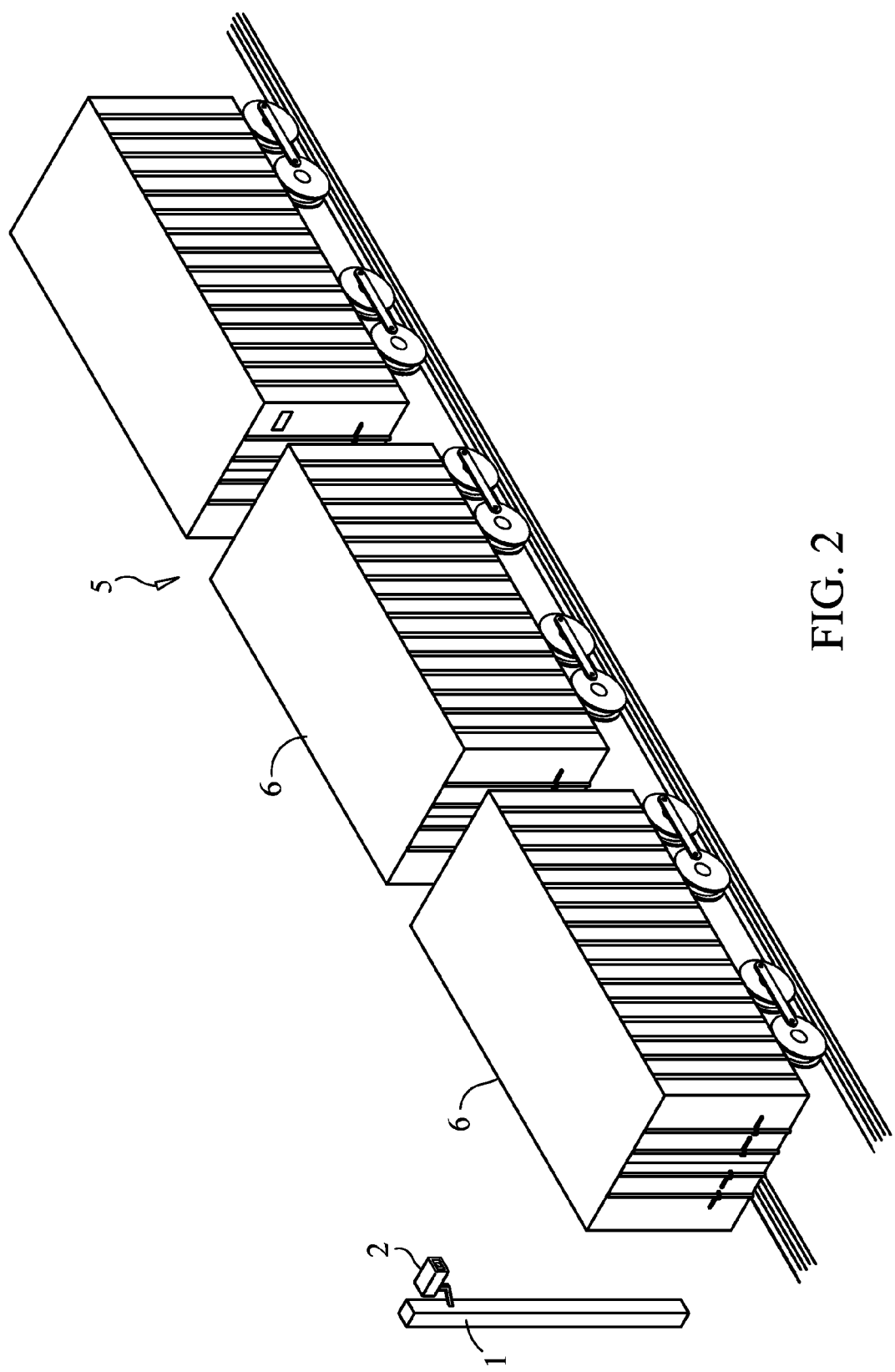
FIG. 2 is a representation of some of the system components in use.

This is a method by which events can be recorded and stored into a database 10 for eventual later use. The events are stored both in terms of time as well as space with this method 7. Particularly in the area of train travel this specific technology will be welcomed but may be used with other different applications as well.

For purposes of illustration the example of train cars 6 will be used. The train 5 will pass through a portal 1, which is a structure to which is mounted a plurality of cameras 2. These cameras 2 will capture video images of the train 5 as it passes through the portal and the cameras that are used are light sensitive 2A and may also have infrared capability 2B. The camera may also produce a color image 2C.

Incorporated into the method and apparatus is a method by which optical flow is measured such as the Lucas Kanade optical flow. This technology determines the pixel flow of the scene and from that information certain other values can be determined, including the speed of the train. The optical flow technology determines only pixel flow through a scene. It is from an analysis of the pixel flow information that the speed of the train can be calculated.

As the train 5 passes through the portal 1, the pixel flow is measured and a video image of each train car 6 is captured. The time of image capture is also recorded. The rate of capture is dependent on the speed of the train as it passes through the portal 1 and the camera speed in terms of frames per second. These images are then stored in a database 10.

The cameras 2, which are mounted on the portal trusses, are designed to operate in periods of low lighting 2A and will probably have infrared 2B capability as well. The camera 2 is likely to be a color 2C camera as well. The camera 2 will capture images of the number of rail cars 6 including the number of containers on the rail cars and the general condition of any particular container or car. All the video images are then fed to a remote location 20 and stored in a database 10.

Software is integrated into this method that will process the pixel flow information and produce a linear panorama 12 of the train so that an operator at a remote facility can view the image of the entire train in an easy to view format. For example it is much more difficult to view individual frames of a moving object but if those individual frames are placed in a linear panorama 12 the view is improved and the interpretation of the image is much better and quicker. The length of the panorama that is presented can be extended or shortened at the request of the operator, if and when desired.

The method also allows the database to store individual images of individual 14 rail cars and assign a specific time to the capture of a specific video image. These images can also be separated from each other so that the operator can view a single car, if desired. This may be important in terms of the security of a particular rail car or the security of the train in general.

The method allows the operator to search for a specific car with the aid of optical recognition software 15. Optical recognition software 15 will allow a search of text, such as the number of a car or wording that may appear on the car of a particular container or rail car. This ability enhances the ability of the method and apparatus to search for very specific items, which are known or designated by the operator.

Although the example of train travel has been highlighted in this application, this method may be used in any application where moving objects are involved such as port facilities, airports, warehouses or parking garages, to name just a few examples. The method may also be a useful law enforcement tool in terms of searching for specific items or to search an area for specific items or events.

Certain background analysis 16 is performed by the capture of the image as well as some environmental parameters 17 that are built into the system. Additionally, the real car height and width 18 is estimated by the video capture. From that information a linear panorama of the moving object, in the case the train can be provided. This provides real time analysis of possible problems.

Certain information about the cars and the train itself may be stored in the database 10 so that, if certain rated parameters are violated, an individual at the remote facility will be alerted and corrective action may be taken.

The inventors claim:

1. A system for interpreting images in temporal or spatial domains for a train, comprising:
   a. a train;
      wherein the train is comprised of a series of train cars;
      wherein said train cars are of predetermined dimensions;
      wherein said train cars are connected together;
   b. cameras;
      wherein a plurality of cameras are positioned at predetermined locations to capture an image of a moving object;
      wherein the cameras capture video images of passing objects;
      wherein the cameras capture images of individual train cars;
   c. software;
      wherein software captures and integrates temporal image information from the cameras;
      wherein dissection of the video images is provided by the software;
      wherein optical recognition software is integrated into the software;
      wherein said optical recognition is performed for each train car;
      wherein the optical flow of the object is measured by the software;
      wherein said optical flow measures the pixel flow in the scene;
      wherein environmental parameters are included in the software;
      wherein background analysis is provided by the software;
   d. database;
      wherein the video images including the time of the video capture are stored in the database;
      wherein a time of image capture is provided for each train car;
      wherein said time of image capture for each image is recorded in the database;
   e. presentation;
      wherein a linear panorama is provided for display;
      wherein individual video images may be displayed;
      wherein the panorama can extend a larger time frame to detect and provide a wider view of the train;
   f. remote facility;
      wherein the presentation is fed to a remote facility.

2. The system as described in claim 1 wherein the cameras are infrared sensitive.

3. The system as described in claim 1 wherein the cameras are color sensitive.

4. The system as described in claim 1 wherein the cameras are color cameras.

5. The system as described in claim 1 wherein objects are identified and stored in the database.

6. The system as described in claim 1 wherein a plurality of remote facilities can view the same images in real time.

* * * * *